(12) United States Patent
Kim

(10) Patent No.: US 9,753,783 B2
(45) Date of Patent: Sep. 5, 2017

(54) SYSTEM AND METHOD FOR ACCELERATING MAPREDUCE OPERATION

(71) Applicant: SAMSUNG SDS CO., LTD., Seoul (KR)

(72) Inventor: Jin Cheol Kim, Yongin-si (KR)

(73) Assignee: SAMSUNG SDS CO., LTD., Seoul (KR)

( * ) Notice: Subject to any disclaimer, the term of this patent is extended or adjusted under 35 U.S.C. 154(b) by 352 days.

(21) Appl. No.: 14/011,946

(22) Filed: Aug. 28, 2013

(65) Prior Publication Data

US 2014/0358869 A1 Dec. 4, 2014

(30) Foreign Application Priority Data

May 31, 2013 (KR) ........................ 10-2013-0062302

(51) Int. Cl.
| | | |
|---|---|---|
| G06F 17/30 | (2006.01) | |
| G06F 9/50 | (2006.01) | |
| G06F 3/06 | (2006.01) | |

(52) U.S. Cl.
CPC ............ *G06F 9/5066* (2013.01); *G06F 3/067* (2013.01); *G06F 17/30* (2013.01)

(58) Field of Classification Search
CPC ......... G06F 17/30; G06F 3/067; G06F 9/5066

(Continued)

(56) References Cited

U.S. PATENT DOCUMENTS

| | | | | |
|---|---|---|---|---|
| 7,117,365 | B1 * | 10/2006 | Rump ................... | H04H 60/14 348/E7.061 |
| 7,650,331 | B1 * | 1/2010 | Dean .................... | G06F 9/5066 712/203 |

(Continued)

FOREIGN PATENT DOCUMENTS

| | | | | |
|---|---|---|---|---|
| ES | WO 2013153029 | A1 * | 10/2013 | ............... G06F 9/54 |
| FR | EP 2746941 | A1 * | 6/2014 | ........... G06F 9/5066 |
| WO | WO 2013153029 | A1 * | 10/2013 | |

OTHER PUBLICATIONS

Wang et al.,"Improving MapReduce Performance Under Widely Distributed Environments", A Thesis Submitted to the Faculty of the Graduate School of the University of Minnesota in Jun. 2012.*

(Continued)

*Primary Examiner* — Nargis Sultana
(74) *Attorney, Agent, or Firm* — Sughrue Mion, PLLC

(57) ABSTRACT

Provided are a system and method for accelerating a mapreduce operation. The system for accelerating a mapreduce operation includes at least one map node configured to perform a map operation in response to a map operation request of a master node, and at least one reduce node configured to perform a reduce operation using result data of the map operation. The map node includes at least one map operation accelerator configured to generate a data stream by merging a plurality of data blocks generated as results of the map operation and establish a transmission channel for transmission of the data stream, and the reduce node includes at least one reduce operation accelerator configured to receive the data stream from the map operation accelerator through the transmission channel, recover the plurality of data blocks from the received data stream, and provide the recovered data blocks for the reduce operation.

22 Claims, 10 Drawing Sheets

(58) Field of Classification Search
USPC .................................. 707/692; 709/201, 224
See application file for complete search history.

(56) References Cited

U.S. PATENT DOCUMENTS

| | | | | |
|---|---|---|---|---|
| 8,112,606 B2* | 2/2012 | Drebinger | ............ | G05B 19/042 711/148 |
| 8,677,003 B1* | 3/2014 | Brashear | ............... | H04L 65/608 709/231 |
| 9,170,848 B1* | 10/2015 | Goldman | .............. | G06F 9/5066 |
| 2003/0043794 A1* | 3/2003 | Cayton | .............. | H04Q 11/0414 370/386 |
| 2005/0238035 A1* | 10/2005 | Riley | ...................... | H04L 45/22 370/401 |
| 2008/0002578 A1* | 1/2008 | Coffman | ................. | H04L 47/10 370/230 |
| 2011/0162069 A1* | 6/2011 | Aupperle | ............. | G06F 21/552 726/22 |
| 2012/0078975 A1* | 3/2012 | Chen | ................. | G06F 17/30516 707/803 |
| 2012/0131139 A1* | 5/2012 | Siripurapu | ............. | H04L 65/60 709/217 |
| 2012/0254193 A1* | 10/2012 | Chattopadhyay | . | G06F 17/30979 707/747 |
| 2012/0278323 A1* | 11/2012 | Chattopadhyay | . | G06F 17/30445 707/737 |
| 2012/0311581 A1* | 12/2012 | Balmin | ................. | G06F 9/5066 718/100 |
| 2012/0331025 A1* | 12/2012 | Gemulla | ............... | G06F 15/781 708/200 |
| 2013/0086356 A1* | 4/2013 | Narang | ................. | G06F 9/5066 712/30 |
| 2013/0132967 A1* | 5/2013 | Soundararajan | ...... | G06F 9/5066 718/104 |
| 2013/0282788 A1* | 10/2013 | Hylick | .............. | G06F 17/30194 709/203 |
| 2013/0332612 A1* | 12/2013 | Cai | ....................... | G06F 9/5066 709/226 |
| 2013/0332931 A1* | 12/2013 | Malewicz | ................. | G06F 7/38 718/102 |
| 2014/0055496 A1* | 2/2014 | Cunningham | ........... | G09G 5/00 345/660 |
| 2014/0215487 A1* | 7/2014 | Cherkasova | .......... | G06F 9/5083 718/106 |
| 2014/0281058 A1* | 9/2014 | Solihin | ............... | G06F 12/0842 710/52 |
| 2015/0358425 A1* | 12/2015 | Vennelakanti | ........... | G01V 1/28 709/226 |

OTHER PUBLICATIONS

Chenyu Wang, "Improving MapReduce Performance Under Widely Distributed Environments" Jun. 2012, A Thesis Submitted to the Faculty of the Graduate School of the University of Minnesota.*

* cited by examiner

SYSTEM AND METHOD FOR ACCELERATING MAPREDUCE OPERATION

CROSS-REFERENCE TO RELATED APPLICATION

This application claims priority to and the benefit of Republic of Korea Patent Application No. 10-2013-0062302, filed on May 31, 2013, the disclosure of which is incorporated herein by reference in its entirety.

BACKGROUND

1. Field

The present disclosure relates to parallel computing technology for processing a large amount of data, and more particularly, to a system and method for accelerating a mapreduce operation.

2. Discussion of Related Art

"Mapreduce" is a software framework developed to support distributed computing for processing a large amount of data. This framework has been developed to support parallel processing of petabytes of data, or more, in a cluster environment, i.e., an environment in which a plurality of computers cooperate to perform one or more processing tasks.

A current system for processing a mapreduce operation is configured to perform a mapreduce operation through a (a) map operation process of generating a key-value pair from original data, and a (b) reduce operation process of converting the generated key-value pair into another key-value pair. In this process, after intermediate data of each operation step is (1) stored in a local file system of a node constituting a distributed computing system, (2) transmitted to a node necessary for the operation, and (3) stored in a local file system of the corresponding node, the node performs a next operation.

Such a mapreduce operation method has an advantage in that it is possible to process a large amount of data while minimizing data movement on a network, but also has a drawback in that the performance deteriorates due to the following five performance bottlenecks occurring in the operation process.

- Performance bottleneck caused by low disk input/output (I/O) speed when a map node reads original data to be used in a map operation from a local file system,
- Performance bottleneck caused by low disk I/O speed in a process of storing temporary key-value pair data generated after the map operation in the local file system before the temporary key-value pair data is transmitted to a reduce node,
- Network delay occurring in a process of transmitting a data block present in the local file system through a network when the data is transmitted to the remote reduce node,
- Performance bottleneck caused by low disk I/O speed in a process of temporarily storing the map key-value pair data transmitted to the reduce node in a local file system of the reduce node, and
- Performance bottleneck of disk I/O occurring in a process of merging and storing the map key-value pair data in the local file system again in the form of a data block for the purpose of a reduce operation.

SUMMARY

One or more exemplary embodiments may overcome the above disadvantage and/or other disadvantages not described above. However, it is understood that one or more exemplary embodiment are not required to overcome the disadvantage described above, and may not overcome any of the problems described above. Embodiments of the present disclosure are directed to providing mapreduce operation acceleration technology for minimizing performance bottlenecks caused by frequent disk input/output (I/O), network delay, etc. that may occur in a mapreduce operation process.

The embodiments of the present disclosure are also directed to providing mapreduce operation acceleration technology whereby an existing mapreduce operation framework can be installed in the form of a plugin without being modified.

In an exemplary embodiment, there is provided a system, intended for use in accelerating a mapreduce operation across computer nodes including a master node, a map node, and a reduce node, the system including: the map node being configured to perform a map operation in response to a map operation request of the master node; and the reduce node being configured to perform a reduce operation using result data of the map operation, wherein: the map node comprises at least one map operation accelerator configured to: generate a data stream by merging a plurality of data blocks, generated as the result data of the map operation; and establish a transmission channel for transmission of the data stream, and the reduce node comprises at least one reduce operation accelerator configured to: receive the data stream from the map operation accelerator through the transmission channel, recover the plurality of data blocks from the received data stream, and provide the recovered data blocks for the reduce operation.

According to an aspect of the exemplary embodiment, in the system, the map node further includes a map operation acceleration controller configured to generate the map operation accelerator in response to the map operation request.

According to an aspect of the exemplary embodiment, in the system, the map operation acceleration controller generates an additional map operation accelerator when an operation accelerator addition request is received.

According to an aspect of the exemplary embodiment, in the system, when a request for transmission of the data stream is received from the reduce node, the map operation acceleration controller redirects the data stream transmission request to the transmission channel.

According to an aspect of the exemplary embodiment, in the system, the map operation acceleration controller generates the data stream by merging the plurality of data blocks in a memory of the map node.

According to an aspect of the exemplary embodiment, in the system, the map operation accelerator includes a data block input/output (I/O) unit configured to read the plurality of data blocks stored in a local file system of the map node; a data block merger configured to generate the data stream by merging the plurality of data blocks read by the data block I/O unit; and a transmission channel controller configured to: generate the transmission channel for transmission of the data stream, and transmit the data stream to the reduce node through the transmission channel in response to a request of the reduce operation accelerator.

According to an aspect of the exemplary embodiment, in the system, the transmission channel is one of a remote direct memory access (RDMA) channel and an ethernet channel.

According to an aspect of the exemplary embodiment, in the system, the transmission channel controller is further configured to: generate a server-side channel connector in response to the request of the reduce operation accelerator, and transmit the data stream to the reduce operation accelerator through the generated server-side channel connector.

According to an aspect of the exemplary embodiment, in the system, the reduce node further includes a reduce operation acceleration controller configured to generate the reduce operation accelerator in response to a reduce operation request of the master node.

According to an aspect of the exemplary embodiment, in the system, when information on the transmission channel is received from the map node, the reduce operation acceleration controller requests the generated reduce operation accelerator to receive the data stream using the received transmission channel information.

According to an aspect of the exemplary embodiment, in the system, the reduce operation accelerator recovers the plurality of data blocks, from the data stream, in a memory of the reduce node.

According to an aspect of the exemplary embodiment, in the system, the reduce operation accelerator comprises: a transmission channel controller configured to receive the data stream through the transmission channel established on a side of the map operation accelerator; a data block divider configured to recover the plurality of data blocks from the received data stream; and a data block input/output (I/O) unit configured to provide the recovered plurality of data blocks to a reduce operator of the reduce node.

According to an aspect of the exemplary embodiment, in the system, the transmission channel controller is further configured to: generate one or more client-side channel connectors, and receive the data stream from the map operation accelerator through the generated client-side channel connectors.

According to an aspect of the exemplary embodiment, in the system, the reduce operation accelerator transmits a channel connection release request to the map operation accelerator when reception of the data stream is completed, and the channel connection release request includes a value indicating a number of generated client-side channel connectors.

According to an aspect of the exemplary embodiment, in the system, when as many connection release messages as the value are received, the map operation accelerator receiving the channel connection release request transmits a response to the channel connection release request, and releases a channel connection with the reduce operation accelerator.

In an exemplary embodiment, there is provided a method of accelerating a mapreduce operation across computer nodes including a master node, a map node, and a reduce node, the method including: configuring the map node to perform a map operation in response to a map operation request of the master; configuring the reduce node to perform a reduce operation using result data of the map operation; merging, with a map operation accelerator of the map node, a plurality of data blocks generated as the result data of the map operation to generate a data stream, and establishing a transmission channel for transmission of the data stream; receiving, with a reduce operation accelerator of the reduce node, the data stream from the map operation accelerator through the transmission channel; and recovering, at the reduce operation accelerator, the plurality of data blocks from the received data stream, and providing the recovered plurality of data blocks for the reduce operation.

According to an aspect of the exemplary embodiment, the method further includes, before establishing the transmission channel, generating, with a map operation acceleration controller of the map node, the map operation accelerator, in response to the map operation request.

According to an aspect of the exemplary embodiment, the method further includes, when an operation accelerator addition request is received, generating an additional map operation accelerator.

According to an aspect of the exemplary embodiment, the method further includes, when a request for transmission of the data stream is received from the reduce node, the map operation acceleration controller redirects the data stream transmission request to the established transmission channel.

According to an aspect of the exemplary embodiment, the method further includes that the transmission channel is one of a remote direct memory access (RDMA) channel and an Ethernet channel.

According to an aspect of the exemplary embodiment, the method further includes that the map operation accelerator: generates a server-side channel connector in response to a request of the reduce operation accelerator, and transmits the data stream to the reduce operation accelerator through the generated server-side channel connector.

According to an aspect of the exemplary embodiment, the method further includes, before receiving the data stream, generating, with a reduce operation acceleration controller of the reduce node, the reduce operation accelerator, in response to a reduce operation request of the master node.

According to an aspect of the exemplary embodiment, the method further includes that, when information on the transmission channel is received from the map operation acceleration controller, the reduce operation acceleration controller requests the reduce operation accelerator to receive the data stream using the received transmission channel information.

According to an aspect of the exemplary embodiment, the method further includes that the receiving of the data stream includes: generating a client-side channel connector, establishing channel connections between the client-side channel connector and a server-side channel connector generated on a side of the map operation accelerator, and receiving the data stream from the map operation accelerator.

According to an aspect of the exemplary embodiment, the method further includes, after receiving the data stream, transmitting, at the reduce operation accelerator, sending a channel connection release request to the map operation accelerator, wherein the channel connection release request includes a value indicating a number of the channel connections established between the reduce operation accelerator and the map operation accelerator.

According to an aspect of the exemplary embodiment, the method further includes that, when as many connection release messages as the value are received from the reduce operation accelerator, the map operation accelerator receiving the channel connection release request transmits a response to the channel connection release request, to the reduce operation accelerator, and releases the channel connections with the reduce operation accelerator.

In an exemplary embodiment, an apparatus for accelerating mapreduce processing includes: a memory configured to store a program code executable on a computer; and a processor configured to execute the program code using the memory, wherein the program code enables the processor to implement operations, including: generating one data stream by merging a plurality of data blocks generated as results of a map operation, and establishing a transmission channel for transmission of the data stream; transmitting and receiving the data stream through the transmission channel; and recovering the plurality of data blocks by dividing the data stream received through the transmission channel in the memory, and providing the recovered plurality of data blocks for a reduce operation.

In another exemplary embodiment, there is provided a non-transitory computer-readable recording medium storing program code which, when executed by a computer, enables a processor of the computer to perform operations, including: generating one data stream by merging a plurality of data blocks generated as results of a map operation, and establishing a transmission channel for transmission of the data stream; transmitting and receiving the data stream through the transmission channel; and recovering the plurality of data blocks by dividing the data stream received through the transmission channel, and providing the recovered plurality of data blocks for a reduce operation.

BRIEF DESCRIPTION OF THE DRAWINGS

The above and other objects, features and advantages of the present disclosure will become more apparent to those of ordinary skill in the art by describing in detail exemplary embodiments thereof with reference to the accompanying drawings, in which.

DETAILED DESCRIPTION OF EXEMPLARY EMBODIMENTS

Hereinafter, detailed embodiments of the present disclosure will be described with reference to drawings. However, the embodiments are merely examples and are not to be construed as limiting the present disclosure.

Various details already understood by those familiar with this field will be omitted to avoid obscuring the gist of the present disclosure. Terminology described below is defined considering functions in the present disclosure and may vary according to a user's or operator's intention or usual practice. Thus, the meanings of the terminology should be interpreted based on the overall context of the present specification.

The spirit of the present disclosure is determined by the claims, and the following exemplary embodiments are provided only to efficiently describe the spirit of the present disclosure to those of ordinary skill in the art.

Figure 1:
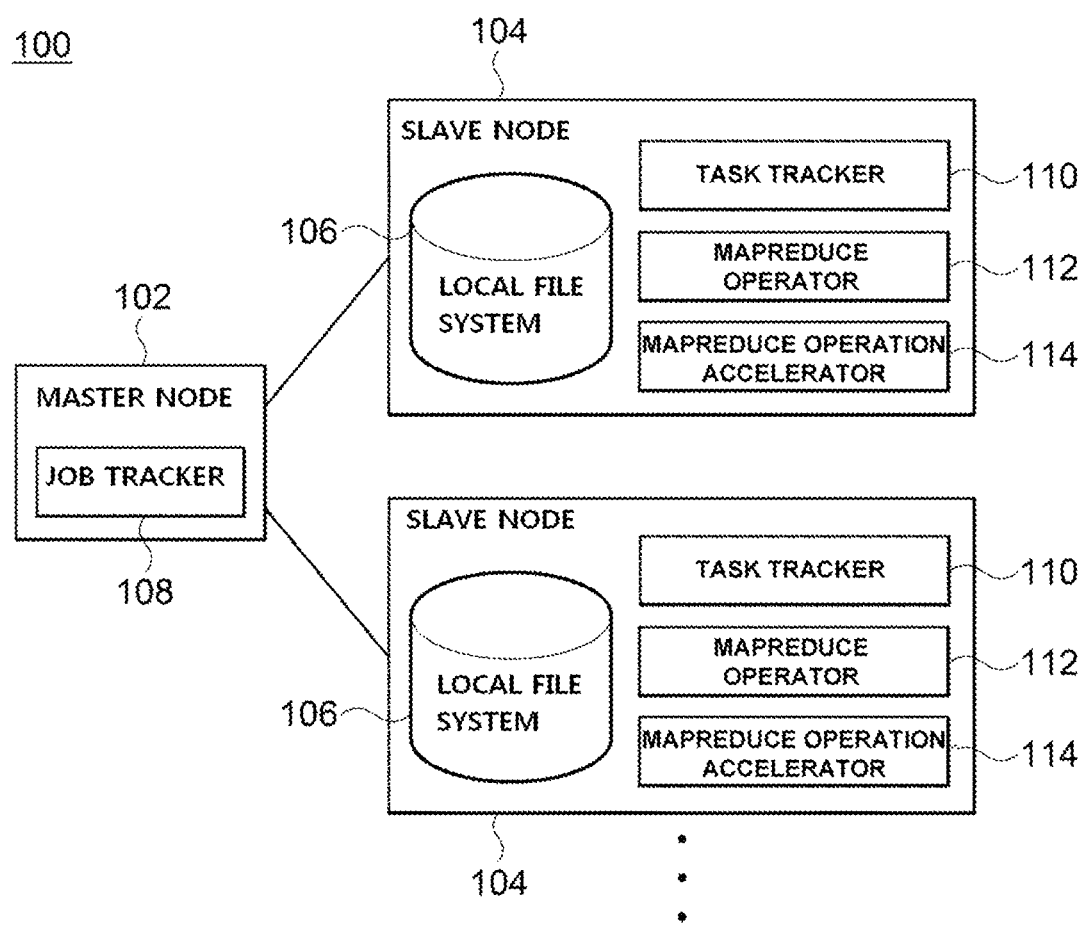
FIG. 1 is a block diagram illustrating a mapreduce operation system including a mapreduce operation accelerator according to an exemplary embodiment of the present disclosure.

FIG. 1 is a block diagram illustrating a mapreduce operation system 100 including a mapreduce operation accelerator according to an exemplary embodiment of the present disclosure. The mapreduce operation system 100 includes a master node 102 and a plurality of slave nodes 104.

The master node 102 divides a large amount of data into blocks of a predetermined size, and distributively stores the blocks in local file systems 106 of the respective slave nodes 104. The master node 102 includes a job tracker 108, and the job tracker 108 distributes a map operation or a reduce operation to the respective slave nodes 104 in response to a mapreduce task request of a user. At this time, to minimize movement of data stored in the local file systems 106, the map operation and the reduce operation are configured to be performed by a node in which operation-target data is stored among the respective slave nodes 104 or a node that is closest to the node in which the data is stored (Fast-Path Input/Output (I/O)).

The slave nodes 104 perform the map operation or the reduce operation under the control of the master node 102. The slave nodes 104 may be classified into map nodes and reduce nodes according to their roles assigned by the master node 102. In other words, in the description below, a "map node" denotes a slave node 10 that performs a map operation using original data, and a "reduce node" denotes a slave node 10 that performs a reduce operation using results of the map operation.

The slave nodes 104 include task trackers 110, mapreduce operators 112, and mapreduce operation accelerators 114 in addition to the aforementioned local file systems 106.

A task tracker 110 receives a map operation request or a reduce operation request from the job tracker 108 of the master node 102, and causes the execution of a mapreduce operator 112 in response to the received request, such that a map operation or a reduce operation can be performed.

A mapreduce operator 112 performs a map operation or reduce operation under the control of the task tracker 110. Details of a map operation and of a reduce operation are well known to those familiar with this field, and the description thereof will be omitted herein. In the description below, to distinguish one from the other, the mapreduce operator 112 will be designated as a map operator 112a when it performs a map operation, and as a reduce operator 112b when it performs a reduce operation.

A mapreduce operation accelerator 114 is a module for solving a bottleneck caused by disk I/O occurring in a map operation or in a reduce operation of the mapreduce operator 112, network delay, etc., and for accelerating an overall mapreduce operation. The makeup of mapreduce operation accelerator 114 will be described in more detail with reference to FIG. 2.

Figure 2:
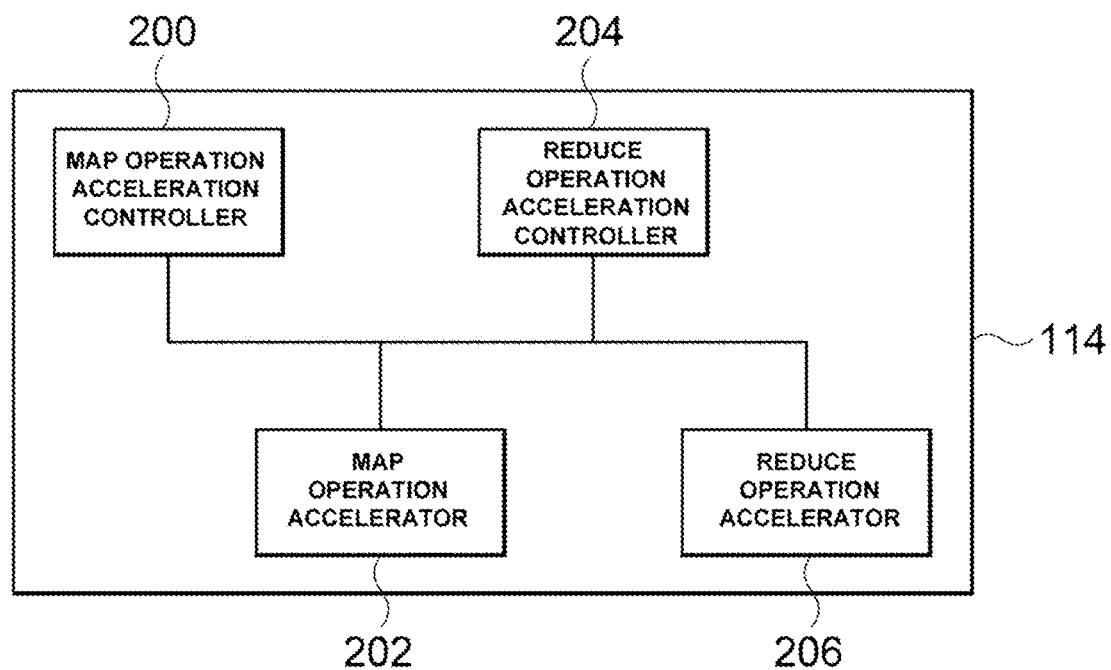
FIG. 2 is a block diagram showing a detailed constitution of a mapreduce operation accelerator according to an exemplary embodiment of the present disclosure.

FIG. 2 is a block diagram showing a more detailed constitution of a mapreduce operation accelerator 114 according to an exemplary embodiment of the present disclosure. As shown in the drawing, the mapreduce operation accelerator 114 includes a map operation acceleration controller 200, a map operation accelerator 202, a reduce operation acceleration controller 204, and a reduce operation accelerator 206. The map operation accelerator 202 is generated, removed, and/or controlled by the map operation acceleration controller 200. The reduce operation accelerator 206 is likewise generated, removed, and/or controlled by the reduce operation acceleration controller 204.

A map operation acceleration controller 200 of a map node generates at least one map operation accelerator 202 in response to a map operation request of a master node 102, and controls the operation of the generated map operation accelerator 202. The map operation acceleration controller 200 may be implemented as a task or process of task tracker 110 of the map node, or may exist as a module separate from the task tracker 110.

The map operation accelerator 202 generates a data stream by merging a plurality of data blocks, generated as results of a map operation performed at the map node. It also generates or requests the setup of a transmission channel for transmission of the data stream. For example, the map operation acceleration controller 202 may generate the data stream by merging the plurality of data blocks in a memory of the map node.

A reduce operation acceleration controller 204 of a reduce node generates at least one reduce operation accelerator 206 in response to a reduce operation request of the master node 102, and controls the operation of the generated reduce operation accelerator 206. Like the map operation acceleration controller 200, the reduce operation acceleration controller 204 may also be present in the task tracker 110 of the reduce node, or may be a module separate from the task tracker 110.

The reduce operation accelerator 206 receives the data stream from the map operation accelerator 202 through the transmission channel generated by the map operation accelerator 202, recovers the plurality of data blocks from the received data stream, and provides the data blocks to a mapreduce operator 112 of the reduce node, in such a manner that a reduce operation can be performed. For example, the reduce operation accelerator 206 may recover the plurality of data blocks, from the data stream, in a memory of the reduce node.

The mapreduce operation accelerator 114 according to an exemplary embodiment of the present disclosure advantageously does not require the modification of an internal structure of an existing mapreduce operation framework, or the addition of a new module. In other words, according to an exemplary embodiment, the mapreduce operation accelerator 114 is present as a module separate from a mapreduce operation framework for a mapreduce operation, and is in a lower functional domain of the mapreduce operation framework. Also, the mapreduce operation accelerator 114 is in an upper layer of a library and an operating system (O/S) kernel module that provides a remote direct memory access (RDMA) function used for acceleration of a data transmission process via a network, and functions as an interface that enables the mapreduce operation framework to transmit data at high speeds using an RDMA function.

Figure 3:
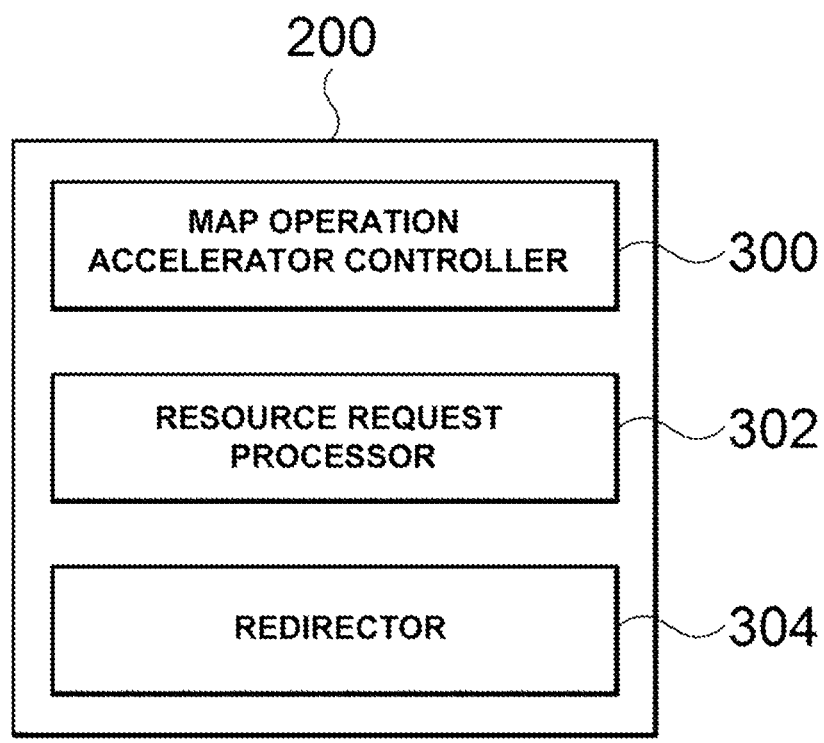
FIG. 3 is a block diagram showing a detailed constitution of a map operation acceleration controller according to an exemplary embodiment of the present disclosure.

FIG. 3 is a block diagram showing a more detailed constitution of a map operation acceleration controller 200 according to an exemplary embodiment of the present disclosure. As shown in the drawing, the map operation acceleration controller 200 according to an exemplary embodiment of the present disclosure includes a map operation accelerator controller 300, a resource request processor 302, and a redirector 304.

The map operation accelerator controller 300 generates at least one map operation accelerator 202 in response to a map operation request of a master node 102, and assigns data stored in a local file system to each generated map operation accelerator 202.

When an operation accelerator addition request is received from the generated map operation accelerator 202, the resource request processor 302 requests the map operation accelerator controller 300 to additionally generate at least one additional map operation acceleration controller 200.

When a request for the transmission of a data stream, from which the map operation accelerator 202 is generated, is received from a reduce node, the redirector 304 redirects the data stream transmission request to a transmission channel established by the map operation accelerator 202, so that the reduce node can receive the data stream through the transmission channel.

Figure 4:
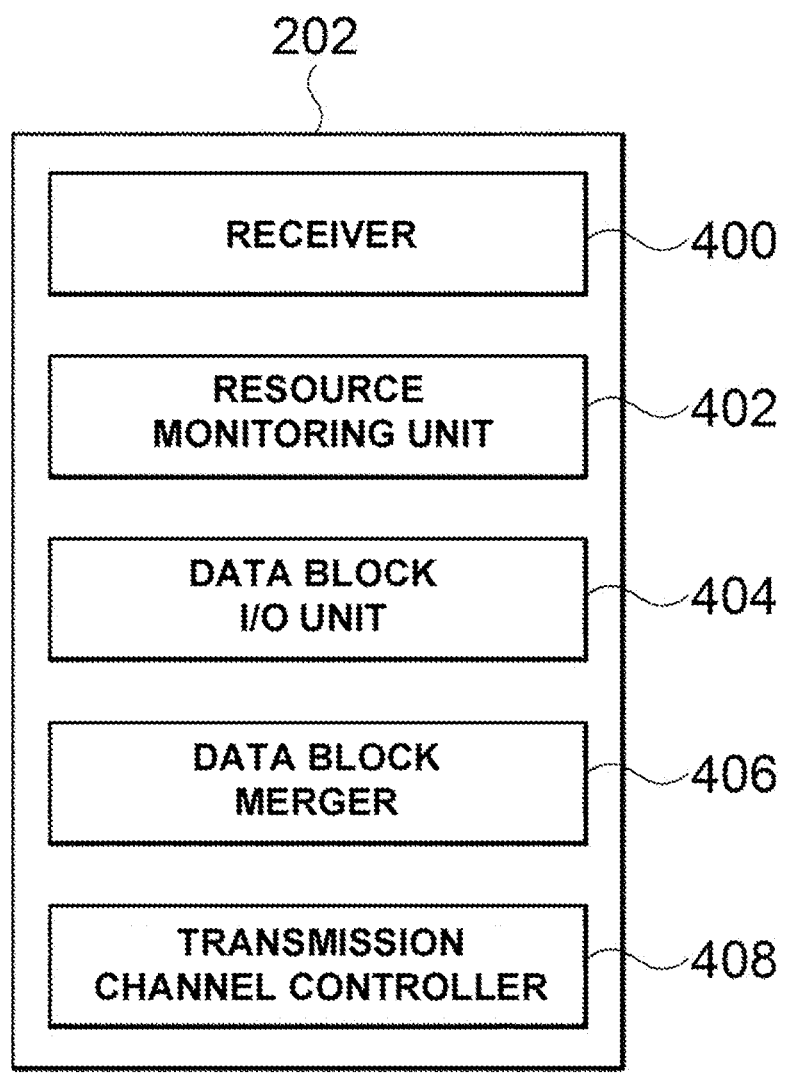
FIG. 4 is a block diagram showing a detailed constitution of a map operation accelerator according to an exemplary embodiment of the present disclosure.

FIG. 4 is a block diagram showing a more detailed constitution of a map operation accelerator 202 according to an exemplary embodiment of the present disclosure. As shown in the drawing, the map operation accelerator 202 according to an exemplary embodiment of the present disclosure includes a receiver 400, a resource monitoring unit 402, a data block I/O unit 404, a data block merger 406, and a transmission channel controller 408.

The receiver 400 receives a control command from a map operation accelerator controller 300, and delivers the control command to another component in the map operation accelerator 202.

The resource monitoring unit 402 monitors the amount of data requested by the map operation accelerator controller 300, the amount of memory currently allocated to the map operation accelerator 202, etc., and determines whether or not an additional map operation accelerator 202 is necessary. When it is determined that the requested amount of data exceeds the amount of data that can presently be processed, the resource monitoring unit 402 requests a resource request processor 302 to generate an additional map operation accelerator 202.

The data block I/O unit 404 accesses a local file system 106 of a map node, and reads the stored plurality of data blocks. Here, the data blocks are those which are map operation result data generated by a mapreduce operator 112 of a map node.

The data block merger 406 generates a data stream by merging the data blocks read by the data block I/O unit 404.

The transmission channel controller 408 establishes a transmission channel for transmission of the data stream generated by the data block merger 406, and transmits the data stream to a reduce node through the transmission channel, in response to a request of a reduce operation accelerator 206 of the reduce node. Here, the transmission channel may be an RDMA channel or an ethernet channel. In response to the request of the reduce operation accelerator 206 of the reduce node, the transmission channel controller 408 establishes an RDMA channel or a general ethernet channel, and streams the data stream through the established channel.

Figure 5:
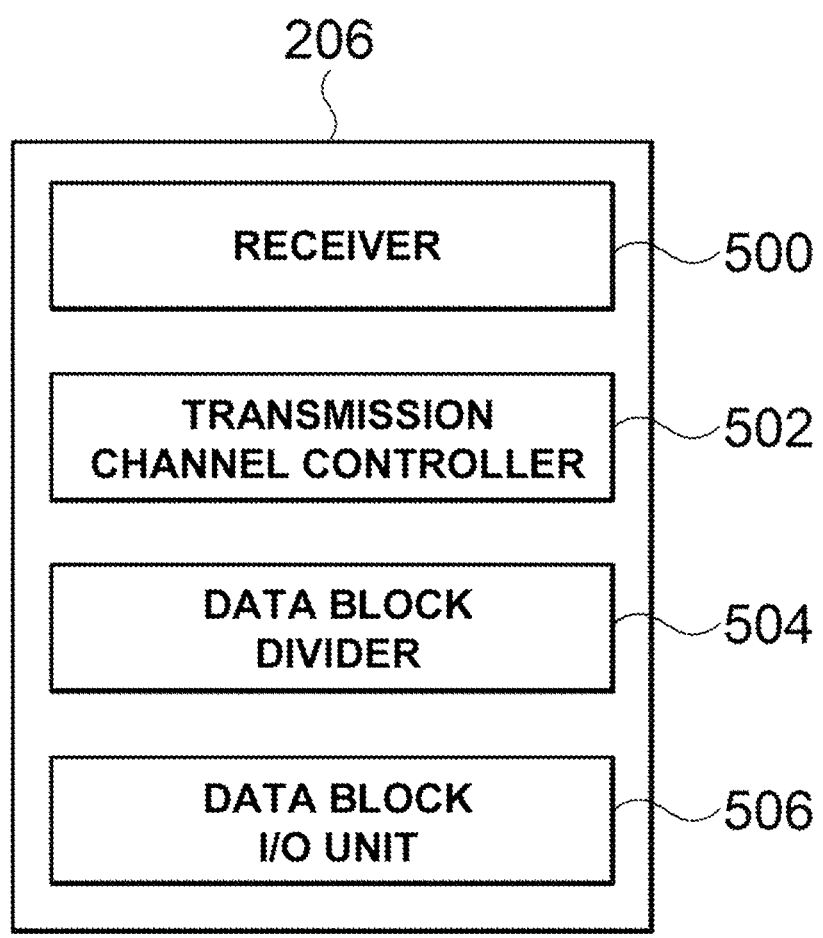
FIG. 5 is a block diagram showing a detailed constitution of a reduce operation accelerator according to an exemplary embodiment of the present disclosure.

FIG. 5 is a block diagram showing a more detailed constitution of a reduce operation accelerator 206 according to an exemplary embodiment of the present disclosure. As shown in the drawing, the reduce operation accelerator 206 includes a receiver 500, a transmission channel controller 502, a data block divider 504, and a data block I/O unit 506.

The receiver 500 receives a control command from a reduce operation acceleration controller 204, and delivers the control command to another component in the reduce operation accelerator 206, as described below.

The transmission channel controller 502 is on the receiving side of the transmission channel established by map operation accelerator 202 of a map node, and receives a data stream through that channel. The transmission channel controller 502 may generate at least one client-side channel connector, and receive the data stream from the map operation accelerator 202 through the generated client-side channel connector.

The data block divider 504 recovers a plurality of data blocks from the received data stream.

The data block I/O unit 506 provides the recovered plurality of data blocks to a mapreduce operator 112 of the corresponding reduce node, so that a reduce operation can be performed.

Figure 6:
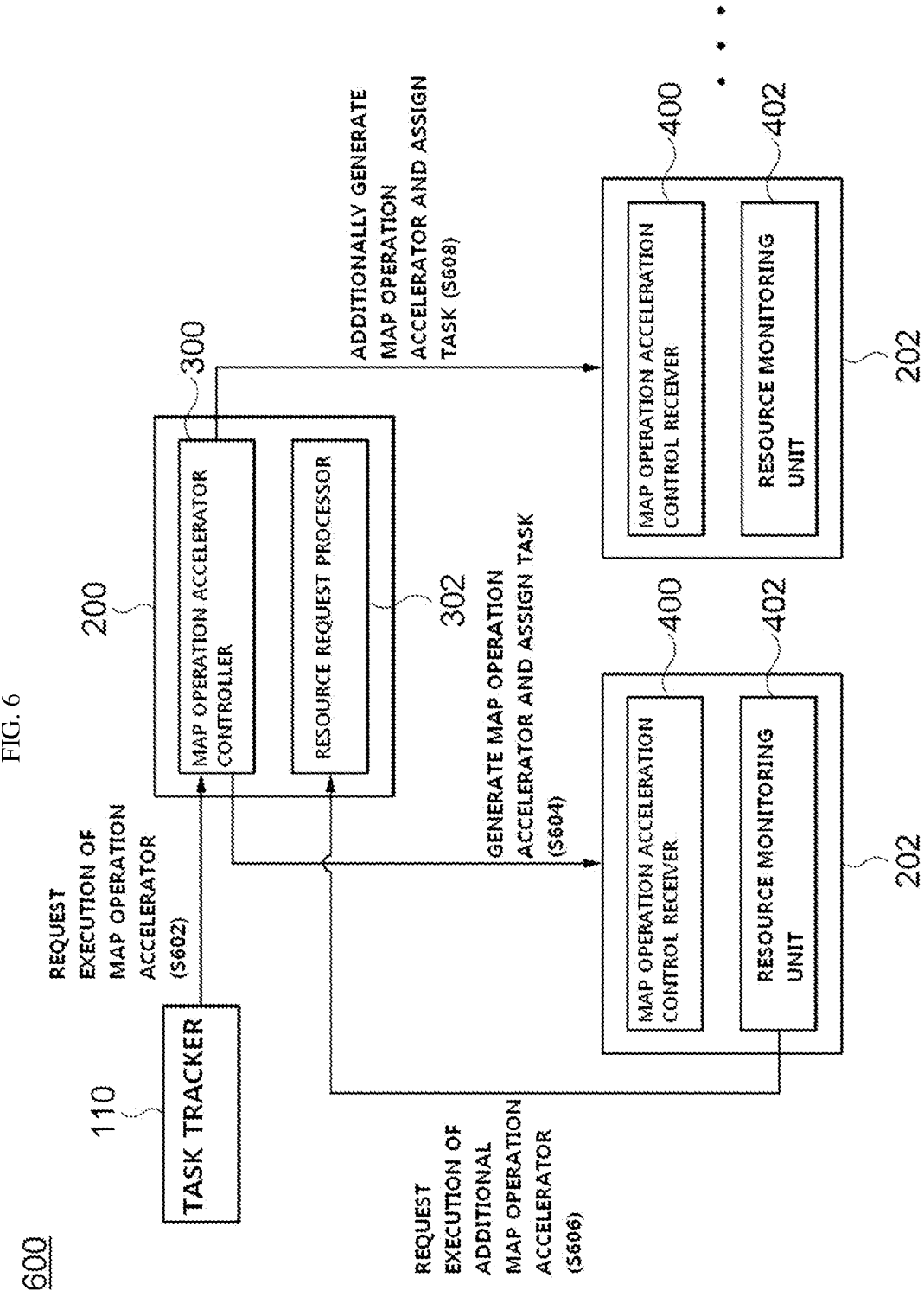
FIG. 6 is a diagram illustrating a process in which a map operation acceleration controller controls a map operation accelerator according to an exemplary embodiment of the present disclosure.

FIG. 6 is a diagram illustrating a process in which a map operation acceleration controller 200 controls a map operation accelerator 202 according to an exemplary embodiment of the present disclosure.

First, a task tracker 110 of a map node requests a map operation accelerator controller 300 of a map operation acceleration controller 200 to execute a map operation accelerator 202 in response to a map operation request of a job tracker 108 (S602). Then, in response to the request, the map operation accelerator controller 300 generates a new map operation accelerator 202, and assigns a task to the generated map operation accelerator 202 (S604).

Subsequently, on an as-needed basis, the executed map operation accelerator 202 requests (S606) a resource request processor 302 of the map operation acceleration controller 200 to generate an additional map operation accelerator 202, when more resources are required than can be accommodated by the executed map operation accelerator 202 (e.g., some example limitations on resource accommodation may be the maximum number of file descriptors that can be input and output, the total amount of currently available memory, etc.).

The resource request processor 302 that receives the request delivers the request to the map operation accelerator controller 300, and the map operation accelerator controller 300 generates an additional map operation accelerator 202 (S608).

Subsequently, the additionally generated map operation accelerator 202 checks the currently remaining amount of data and the number of currently remaining files, and may request the generation of yet another additional map operation accelerator 202 from the map operation acceleration controller 200, when an additional map operation accelerator 202 is still necessary taking into consideration resources such as the number of file descriptors that can be allocated by the map operation accelerator 202, and available memory. In other words, the process is repeated until the throughput capabilities of the generated map operation accelerators 202 reaches a level sufficient to process the input and output of requested data.

Figure 7:
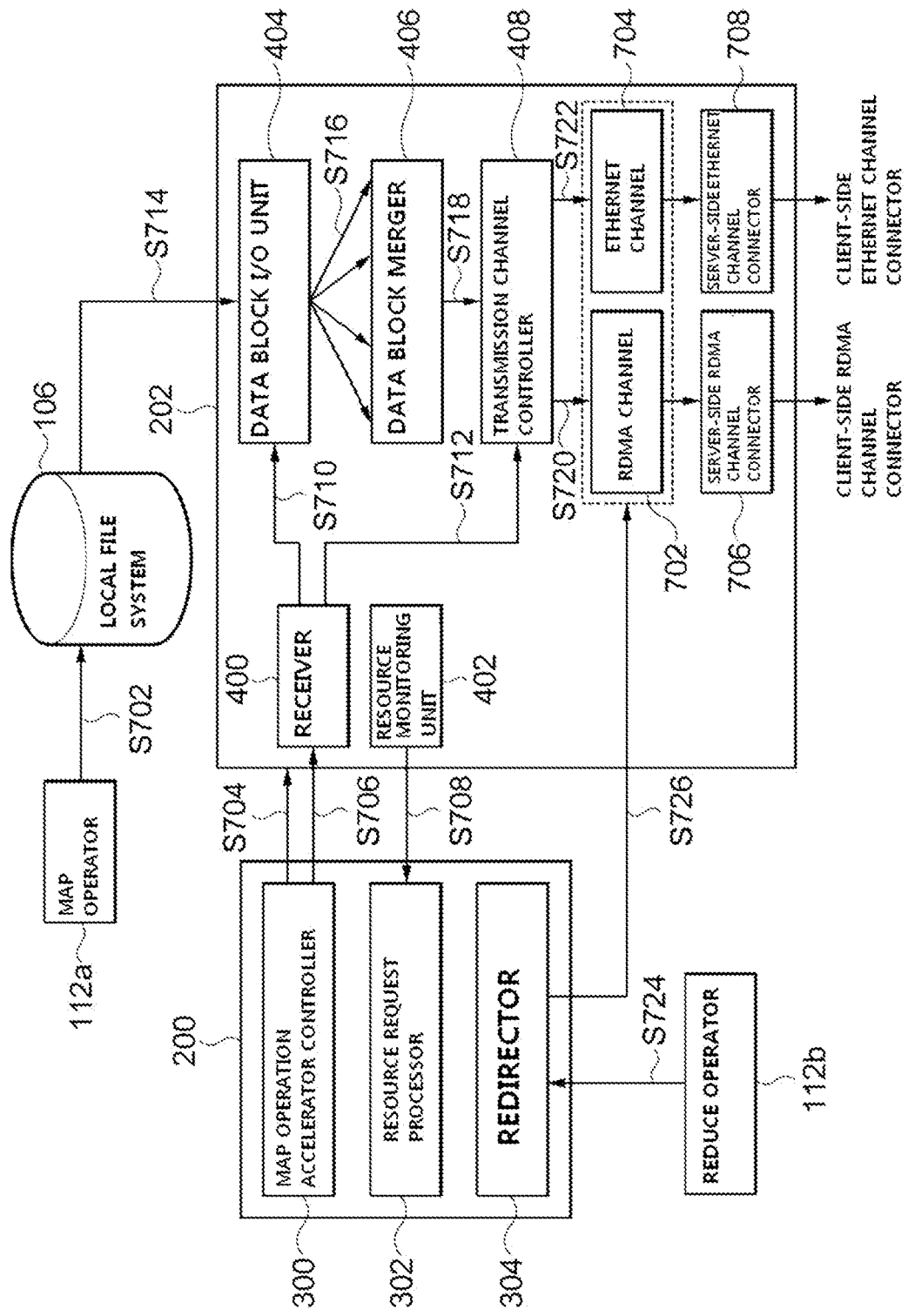
FIG. 7 and FIG. 8 are diagrams illustrating a mapreduce operation acceleration process employing a mapreduce operation accelerator according to an exemplary embodiment of the present disclosure.
Figure 8:
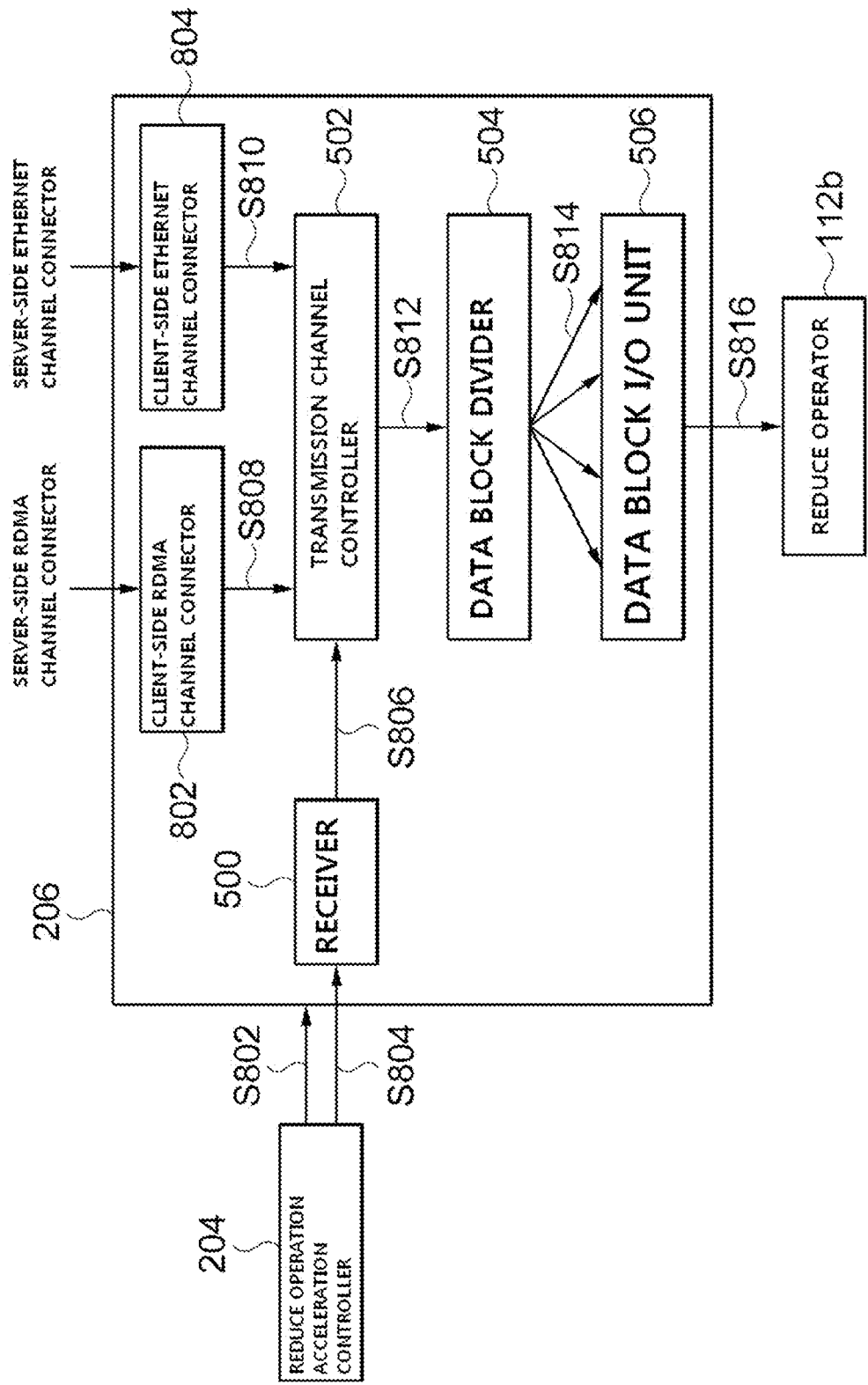

FIG. 7 and FIG. 8 are diagrams illustrating a mapreduce operation acceleration process employing a mapreduce operation accelerator 114 according to an exemplary embodiment of the present disclosure. FIG. 7 illustrates the mapreduce operation acceleration steps at a map node, and FIG. 8 illustrates the mapreduce operation acceleration steps at a reduce node.

First, when a task tracker 110 of a map node receives a map operation execution request from a job tracker 108 of a master node 102, the task tracker 110 performs a map operation assigned to the corresponding node using a map operator 112a, and stores the result data of the map operation in a local file system 106 (S702).

Subsequently, a map operation accelerator controller 300 of a map operation acceleration controller 200 generates one map operation accelerator 202 (S704), and assigns a task to the generated map operation accelerator 202 (S706). A resource monitoring unit 402 of the generated map operation accelerator 202 checks the number of files of requested data, the current amount of memory of the node, etc., and requests a resource request processor 302 of the map operation acceleration controller 200 to generate an additional map operation accelerator 202 when it is determined that the currently executing map operation accelerator 202 cannot process the requested data with its throughput (S708). Then, in response to the additional accelerator generation request received through the resource request processor 302, the map operation accelerator controller 300 additionally generates at least one map operation accelerator 202. Such an addition of a map operation accelerator 202 is repeated until sufficient map operation accelerators 202 to input and output the currently requested data are generated.

Subsequently, a receiver 400 of each generated map operation accelerator 202 receives a request for processing data stored in the local file system 106 from the map operation accelerator controller 300, and delivers the request to a data block I/O unit 404 (S710). Also, through the receiver 400, the map operation accelerator controller 300 causes a transmission channel controller 408 to establish an RDMA server channel 702 or an Ethernet channel 704 and to stand by (S712).

Subsequently, the data block I/O unit 404 in the map operation accelerator 202 reads the result data blocks, of the map operation, stored in the local file system 106 of the map node (S714), and delivers the read data blocks to a data block merger 406 (S716), and the data block merger 406 generates one data stream by merging the data blocks (S718). Then, the transmission channel controller 408 transmits the generated data stream through a server-side channel connector 706 or 708 of the established RDMA server channel 702 or the established Ethernet channel 704 (S720 or S722).

Meanwhile, a redirector 304 of the map operation acceleration controller 200 receives a request for transmission of the map operation results from a reduce operator 112b in a reduce node (S724), and redirects the transmission request to the established RDMA channel 702 or the established Ethernet channel 704 (S726), such that the reduce operator 112b can receive the map operation results through the RDMA channel 702 or the Ethernet channel 704.

Next, the mapreduce operation acceleration steps at the reduce node will be described with reference to FIG. 8.

First, a reduce operation acceleration controller 204 of the reduce node executes a reduce operation accelerator 206 in response to a request of a task tracker 110 of the reduce node (S802), and requests the reduce operator 112b to read data from the map node using information on the RDMA channel 702 or the Ethernet channel 704 received from the redirector 304 (S804).

A transmission channel controller 502 of the reduce operation accelerator 206 receives the request through a receiver 500 (S806), generates a client-side RDMA channel connector 802 or a client-side Ethernet channel connector 804, accesses the server-side RDMA channel connector 706 or the server-side Ethernet channel connector 708 to establish a connection, and then receives the data stream through the connection (S808 or S810).

A data block divider 504 receives the data stream from the transmission channel controller 502 (S812), and recovers the plurality of data blocks from the received data stream (S814). Subsequently, a data block I/O unit 506 provides the recovered plurality of data blocks to the reduce operator 112b (S816), so that a reduce operation can be performed.

Figure 9:
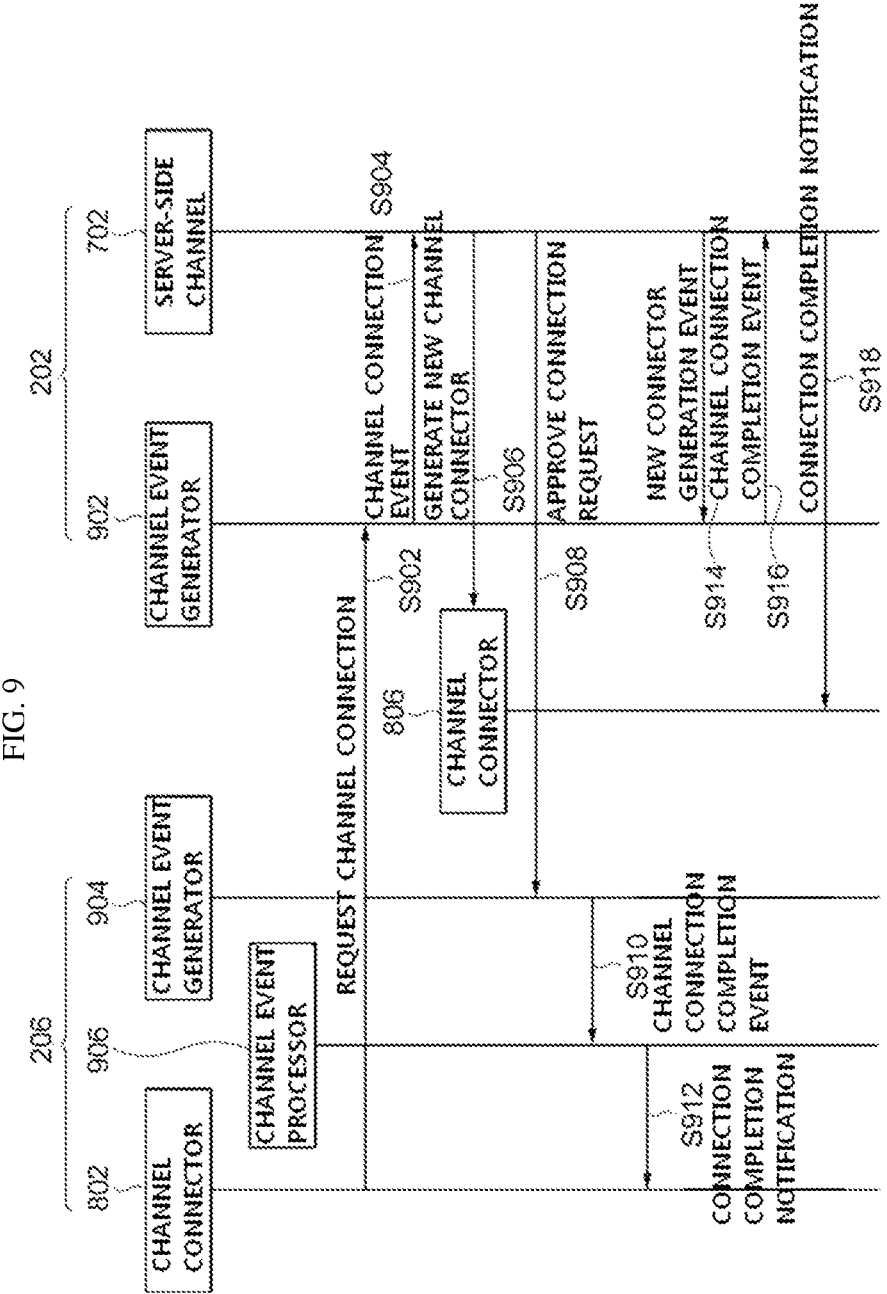
FIG. 9 is a flowchart illustrating a channel establishment process between a map operation accelerator and a reduce operation accelerator according to an exemplary embodiment of the present disclosure.

FIG. 9 is a flowchart illustrating a channel establishment process between a map operation accelerator 202 and a reduce operation accelerator 206 according to an exemplary embodiment of the present disclosure.

First, a transmission channel controller 502 of the reduce operation accelerator 206 generates a channel connector in response to a request from a reduce operator 112b. Although the channel connector is an RDMA channel connector 802 in the illustrated exemplary embodiment, the present disclosure is not limited to the RDMA channel connector 802, and the generated channel connector may be the RDMA channel connector 802 or a general Ethernet channel connector 804, or another type of connecter, according to the type of a data transmission channel established at a map operation node.

The generated channel connector 802 transmits a channel connection request event to a channel event generator 902 on the side of the map operation accelerator 202 (S902), and the channel event generator 902 receiving the channel connection request event delivers the channel connection request event to a server-side channel 702 (RDMA server channel or Ethernet server channel) (S904). Then, the server-side channel 702 generates and causes a channel connector 806 (RDMA channel connector or ethernet channel connector) to stand by, in response to the channel connection request event (S906).

Subsequently, when the server-side channel 702 transmits a connection request approval message to a channel event generator 904 of a reduce node (S908), the channel event generator 904 generates a channel connection completion event at a channel event processor 906 (S910). Then, the channel event processor 906 sends a channel connection completion notification to the channel connector 802 or 804 on the reduce operation accelerator side, thereby causing the transmission of a data stream to be prepared (S912).

Meanwhile, the server-side channel 702, having approved the connection request, delivers a channel connector generation event to the channel event generator 902 (S914), and the channel event generator 902 generates a channel connection completion event at the server-side channel 702 in response to the channel connector generation event (S916). Subsequently, the server-side channel 702 sends a channel connection completion notification to the channel connector 806 (S918), so that the data stream can be transmitted to the channel connector 802 or 804 on the side of the reduce operation accelerator 202.

Figure 10:
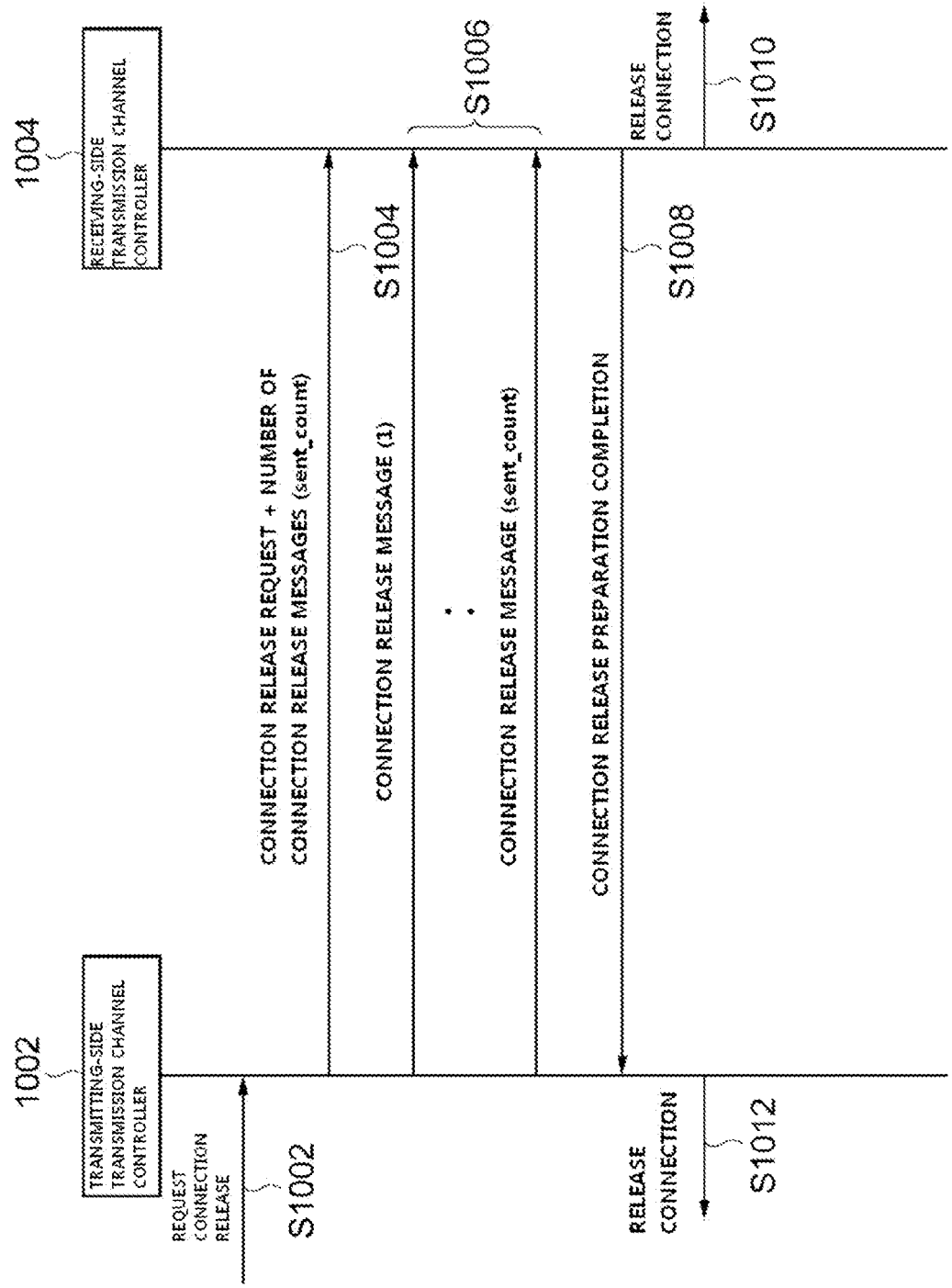
FIG. 10 is a flowchart illustrating a channel connection release process between a map operation accelerator and a reduce operation accelerator according to an exemplary embodiment of the present disclosure.

FIG. 10 is a flowchart illustrating a channel connection release process between a map operation accelerator and a reduce operation accelerator, according to an exemplary embodiment of the present disclosure. In an exemplary embodiment of the present disclosure, a channel connection between a map operation accelerator 202 and a reduce operation accelerator 206 may be performed through a connection release request of any one of the map operation accelerator 202 and the reduce operation accelerator 206. For convenience, the map operation accelerator 202 or the reduce operation accelerator 206 that transmits a connection release request will be designated as a first operation accelerator, and the map operation accelerator 202 or the reduce operation accelerator 206 that receives the connection release request will be designated as a second operation accelerator.

In an exemplary embodiment of the present disclosure, the map operation accelerator 202 and the reduce operation accelerator 206 transmits or receives a data stream through a different number of channel connectors, according to the number of data blocks and the amount of data to be used in the corresponding map operation or reduce operation. Since different numbers of channel connectors may be generated for the map operation accelerator 202 and the reduce operation accelerator 206, respectively, a separate protocol is necessary to stably release the connection after the transmission of the data stream.

First, when a connection release request is received by a transmission channel controller 1002 of the first operation accelerator (S1002), the transmission channel controller 1002 transmits a connection release request to a transmission channel controller 1004 of the second operation accelerator to release a connection established between the first operation accelerator and the second operation accelerator (S1004). At this time, the transmission channel controller 1002 transmits a number of channel connectors (the number of connection release messages) sent_count connected with the second operation accelerator together with the connection release request.

The transmission channel controller 1004 of the second operation accelerator receiving the connection release request waits until as many connection release messages as the received number of connection release messages sent_count are received from the first operation accelerator (S1006). When as many connection release messages as the number of connection release messages sent_count arrive, the transmission channel controller 1004 delivers a connection release preparation completion message to the first operation accelerator side (S1008), and releases the connection with the first operation accelerator (S1010). The first operation accelerator receiving the connection release preparation completion message finishes the transmission of the data stream while releasing the connection with the second operation accelerator in response to the connection release preparation completion message (S1012).

When a channel connection between respective operation accelerators is released through such a process, it is possible to prevent a channel connection that has a counterpart from being released while the channel connector is currently transmitting a data stream, i.e., it is possible to prevent release of active channel connections.

Meanwhile, exemplary embodiments of the present disclosure may include a computer-readable recording medium including a program for performing the methods described herein on a computer. The computer-readable recording medium may separately include program commands, local data files, local data structures, etc. or include a combination of them. The medium may be specially designed and configured for the present disclosure, or known to those of ordinary skill in the field of computer software and available. Examples of the computer-readable recording medium include magnetic media, such as a hard disk, a floppy disk, and a magnetic tape, optical recording media, such as a CD-ROM and a DVD, magneto-optical media, such as a floptical disk, and hardware devices, such as a ROM, a RAM, and a flash memory, specially configured to store and perform program commands. Examples of the program commands may include high-level language codes executable by a computer using an interpreter, etc. as well as machine language codes made by compilers. It will be understood that the implementation of exemplary embodiments in an apparatus, such as a computer having a processor core of one or more processors, and execution memory, is expressly laid out above, but the same result may be achieved through special purpose circuitry and devices.

In exemplary embodiments of the present disclosure, key-value pair data generated as a result of a map operation at a map node is not recorded in a local file system on a disk but is transmitted from a memory directly to a remote reduce node in the form of a continuous stream, so that performance bottlenecks caused by unnecessary disk I/O of the map node can be avoided.

In addition, to prevent network delay occurring when the map node transmits the data to the remote reduce operation node, an RDMA channel is established between the map node and the reduce operation node, and the data stream is transmitted through the RDMA channel, such that the problem of a performance bottleneck caused by the network delay can be minimized.

Further, without a disk I/O process of temporarily storing the key-value pair data transmitted to the reduce node in a local file system of the reduce node, data blocks are obtained by merging the map key-value pair data in a memory immediately upon receipt of the map key-value pair data, and then are not written on a disk but are directly delivered from the memory for a reduce operation, so that the problem of a performance bottleneck caused by disk I/O speed can be avoided.

Moreover, a mapreduce operation accelerator according to exemplary embodiments of the present disclosure is implemented in the form of an additional plugin to improve operational performance even without the modification of an existing mapreduce architecture, and thus can be readily applied to an existing mapreduce operation framework.

It will be apparent to those familiar with this field that various modifications can be made to the above-described exemplary embodiments of the present disclosure without departing from the spirit or scope of the present disclosure. Thus, it is intended that the present disclosure covers all such modifications provided they come within the scope of the appended claims and their equivalents.

What is claimed is:

1. A system for accelerating a mapreduce operation across computer nodes including a master node, a map node, and a reduce node, the system comprising:
   a memory comprising computer executable instructions; and
   a processor configured to read and execute the computer executable instructions to implement:
      the map node being configured to perform a map operation in response to a map operation request of the master node; and
      the reduce node being configured to perform a reduce operation using result data of the map operation,
   wherein:
   the map node comprises at least one map operation accelerator configured to:
      generate a data stream by merging a plurality of data blocks, generated as the result data of the map operation; and
      establish a transmission channel for transmission of the data stream, the transmission channel comprises a remote direct memory access (RDMA) channel between the map node and the reduce node, and
   the reduce node comprises at least one reduce operation accelerator configured to:
      receive the data stream from the map operation accelerator through the transmission channel,
      recover the plurality of data blocks from the received data stream without storing the data stream in a local file system of the reduce node, and
      provide the recovered data blocks for the reduce operation,
   wherein the map operation accelerator is configured to monitor an amount of data requested by a map operation accelerator controller and an amount of a memory currently allocated to the map operation accelerator, determine whether the requested amount of data exceeds the currently allocated amount of the memory, and transmit an operation accelerator addition request to the map operation accelerator controller when it is determined that the requested amount of data exceeds the currently allocated amount of the memory,
   wherein the map operation accelerator controller is configured to generate an additional map operation accelerator when the operation accelerator addition request is received, and
   wherein each map operation accelerator is configured to generate the data stream by merging the plurality of data blocks in a memory of the map node.

2. The system of claim 1, wherein, when a request for transmission of the data stream is received from the reduce node, the map operation accelerator controller redirects the data stream transmission request to the transmission channel.

3. The system of claim 1, wherein the map operation accelerator comprises:
   a data block input/output (I/O) unit configured to read the plurality of data blocks stored in a local file system of the map node;
   a data block merger configured to generate the data stream by merging the plurality of data blocks read by the data block I/O unit; and
   a transmission channel controller configured to:
   generate the transmission channel for transmission of the data stream, and
   transmit the data stream to the reduce node through the transmission channel in response to a request of the reduce operation accelerator.

4. The system of claim 3, wherein the transmission channel is an ethernet channel.

5. The system of claim 3, wherein the transmission channel controller is further configured to:
   generate a server-side channel connector in response to the request of the reduce operation accelerator, and
   transmit the data stream to the reduce operation accelerator through the generated server-side channel connector.

6. The system of claim 1, wherein the reduce node further comprises a reduce operation acceleration controller configured to generate the reduce operation accelerator in response to a reduce operation request of the master node.

7. The system of claim 6, wherein, when information on the transmission channel is received from the map node, the reduce operation acceleration controller requests the generated reduce operation accelerator to receive the data stream using the received transmission channel information.

8. The system of claim 1, wherein the reduce operation accelerator recovers the plurality of data blocks, from the data stream, in a memory of the reduce node.

9. The system of claim 1, wherein the reduce operation accelerator comprises:
   a transmission channel controller configured to receive the data stream through the transmission channel established on a side of the map operation accelerator;
   a data block divider configured to recover the plurality of data blocks from the received data stream; and a data block input/output (I/O) unit configured to provide the recovered plurality of data blocks to a reduce operator of the reduce node.

10. The system of claim 9, wherein the transmission channel controller is further configured to:
generate one or more client-side channel connectors, and
receive the data stream from the map operation accelerator through the generated client-side channel connectors.

11. The system of claim 10, wherein:
the reduce operation accelerator transmits a channel connection release request to the map operation accelerator when reception of the data stream is completed, and
the channel connection release request includes a value indicating a number of generated client-side channel connectors.

12. The system of claim 11, wherein, when as many connection release messages as the value are received, the map operation accelerator receiving the channel connection release request transmits a response to the channel connection release request, and releases a channel connection with the reduce operation accelerator.

13. The system of claim 1, wherein the at least one map operation accelerator and the at least one reduce operation accelerator are a module separate from a mapreduce operation framework for a mapreduce operation, and are in a lower functional domain of the mapreduce operation framework.

14. A computer-implemented method of accelerating a mapreduce operation across computer nodes including a master node, a map node, and a reduce node, the method comprising:
configuring the map node to perform a map operation in response to a map operation request of the master;
configuring the reduce node to perform a reduce operation using result data of the map operation;
merging, with a map operation accelerator of the map node, a plurality of data blocks generated as the result data of the map operation to generate a data stream, and establishing a transmission channel for transmission of the data stream, the transmission channel comprises a remote direct memory access (RDMA) channel between the map node and the reduce node;
receiving, with a reduce operation accelerator of the reduce node, the data stream from the map operation accelerator through the transmission channel; and
recovering, at the reduce operation accelerator, the plurality of data blocks from the received data stream without storing the data stream in a local file system of the reduce node, and providing the recovered plurality of data blocks for the reduce operation,
wherein, before establishing the transmission channel, the map operation accelerator is configured to monitor an amount of data requested by a map operation accelerator controller and an amount of a memory currently allocated to the map operation accelerator, determine whether the requested amount of data exceeds the currently allocated amount of the memory, and transmit an operation accelerator addition request to the map operation accelerator controller when it is determined that the requested amount of data exceeds the currently allocated amount of the memory,
wherein the map operation accelerator controller is configured to generate an additional map operation accelerator when the operation accelerator addition request is received, and
wherein each map operation accelerator is configured to generate the data stream by merging the plurality of data blocks in a memory of the map node.

15. The method of claim 14, wherein, when a request for transmission of the data stream is received from the reduce node, the map operation accelerator controller redirects the data stream transmission request to the established transmission channel.

16. The method of claim 14, wherein the transmission channel is an Ethernet channel.

17. The method of claim 14, wherein the map operation accelerator:
generates a server-side channel connector in response to a request of the reduce operation accelerator, and
transmits the data stream to the reduce operation accelerator through the generated server-side channel connector.

18. The method of claim 14, further comprising, before receiving the data stream, generating, with a reduce operation acceleration controller of the reduce node, the reduce operation accelerator, in response to a reduce operation request of the master node.

19. The method of claim 18, wherein, when information on the transmission channel is received from the map node, the reduce operation acceleration controller requests the reduce operation accelerator to receive the data stream using the received transmission channel information.

20. The method of claim 18, wherein the receiving of the data stream comprises:
generating a client-side channel connector,
establishing channel connections between the client-side channel connector and a server-side channel connector generated on a side of the map operation accelerator, and
receiving the data stream from the map operation accelerator.

21. The method of claim 20, further comprising, after receiving the data stream, transmitting, at the reduce operation accelerator, sending a channel connection release request to the map operation accelerator, wherein the channel connection release request includes a value indicating a number of the channel connections established between the reduce operation accelerator and the map operation accelerator.

22. The method of claim 21, wherein, when as many connection release messages as the value are received from the reduce operation accelerator, the map operation accelerator receiving the channel connection release request transmits a response to the channel connection release request, to the reduce operation accelerator, and releases the channel connections with the reduce operation accelerator.

* * * * *